United States Patent
Pringiers

(10) Patent No.: US 8,826,953 B2
(45) Date of Patent: Sep. 9, 2014

(54) WHEEL, RIM AND TIRE

(75) Inventor: Koenraad Pringiers, Colombo (LK)

(73) Assignee: Artic Investments S.A., Luxembourg (LU)

(*) Notice: Subject to any disclaimer, the term of this patent is extended or adjusted under 35 U.S.C. 154(b) by 568 days.

(21) Appl. No.: 12/736,128

(22) PCT Filed: Dec. 23, 2008

(86) PCT No.: PCT/EP2008/068225
§ 371 (c)(1),
(2), (4) Date: Feb. 22, 2011

(87) PCT Pub. No.: WO2009/112110
PCT Pub. Date: Sep. 17, 2009

(65) Prior Publication Data
US 2011/0132511 A1    Jun. 9, 2011

(30) Foreign Application Priority Data
Mar. 11, 2008 (EP) ............................. 08152615

(51) Int. Cl.
*B60C 7/24* (2006.01)
*B60B 21/02* (2006.01)
*B60C 7/22* (2006.01)
*B60B 21/10* (2006.01)
*B60B 21/04* (2006.01)

(52) U.S. Cl.
CPC .............. *B60B 21/04* (2013.01); *B60B 21/023* (2013.01); *B60C 7/22* (2013.01); *B60C 7/24* (2013.01); *B60B 21/102* (2013.01); *B60B 21/104* (2013.01)

USPC .......................................................... 152/323

(58) Field of Classification Search
USPC .......... 152/5, 7, 17, 40, 47, 48, 379.3, 379.5, 152/379.4, 380, 381.3, 381.4, 381.5, 381.6
See application file for complete search history.

(56) References Cited

U.S. PATENT DOCUMENTS

| | | | | |
|---|---|---|---|---|
| 1,391,846 A | * | 9/1921 | Nienaber | 156/92 |
| 1,575,910 A | * | 3/1926 | Goersch | 152/403 |
| 2,393,161 A | * | 1/1946 | Haushalter | 152/325 |
| 2,525,196 A | * | 10/1950 | Bacon | 152/323 |

(Continued)

FOREIGN PATENT DOCUMENTS

| | | |
|---|---|---|
| DE | 28 13 213 | 9/1979 |
| DE | 34 05 039 | 8/1985 |

(Continued)

*Primary Examiner* — S. Joseph Morano
*Assistant Examiner* — Jean Charleston
(74) *Attorney, Agent, or Firm* — Jacobson Holman PLLC

(57) ABSTRACT

A wheel (1) comprising a solid tire (2) and a rim (3), the solid tire (2) comprising a rubber base layer (4) with a reduced height (16) extending in circumferential direction of the tire (2), an inner circumferential contact surface (8) of the rubber base layer (4) being provided to contact an outer circumferential contact surface (9) of the rim (3), the solid tire (2) upon mounting to the rim (3) being provided to be pulled over the circumferential outer contact surface (9) of the rim (3) along a mounting direction at least partly running along an axial direction of the tire (2), characterized in that for each position on the outer contact surface (9) of the rim (3) and the inner contact surface (8) of the tire (2), in mounting direction of the tire (2), at most one engaging set (10) of the protrusion (11) and the corresponding groove (12) is provided.

11 Claims, 3 Drawing Sheets

(56) References Cited

U.S. PATENT DOCUMENTS

| | | | |
|---|---|---|---|
| 4,566,515 A * | 1/1986 | Kuhn | 152/402 |
| 4,878,527 A * | 11/1989 | Noma | 152/379.3 |
| 5,343,916 A * | 9/1994 | Duddey et al. | 152/5 |
| 6,142,203 A * | 11/2000 | Bickford | 152/302 |
| 7,334,617 B2 * | 2/2008 | Hill et al. | 152/47 |
| 2003/0201043 A1 * | 10/2003 | Adams et al. | 152/5 |

FOREIGN PATENT DOCUMENTS

| | | |
|---|---|---|
| DE | 34 06 007 | 8/1985 |
| DE | 84 13 565 | 8/1985 |
| DE | 20 2005 000 339 | 3/2005 |
| DE | 10 2004 009661 | 9/2005 |
| EP | 1 338 439 | 8/2003 |
| GB | 2 021 493 | 12/1979 |

* cited by examiner

WHEEL, RIM AND TIRE

This is a 371 of PCT/EP08/068,225 filed Dec. 23, 2008, which has a priority of European no. 08152615.4 filed Mar. 11, 2008, hereby incorporated by reference.

The present invention relates to a wheel according to the preamble of the first claim.

The present invention also relates to a tire and a rim for a wheel according to the invention.

DE-A1-10 2004 009 661 discloses a vehicle wheel comprising a solid tire and a rim. The solid tire comprises a rubber base layer with a reduced height, meaning in DE-A1-10 2004 009 661 that the height of the rubber base layer with respect to the height of the tire is less than 10%. In circumferential direction of the tire, an inner contact surface of the tire contacts an outer contact surface of the rim facing the tire. Each of the two opposite circumferential edges of the outer contact surface of the rim is delimited by a circumferential rim edge. The outer contact surface of the rim further comprises a first circumferential groove adjacent to and running along the first circumferential rim edge and a second circumferential groove adjacent to and running along the second opposite circumferential rim edge. The inner contact surface of the tire comprises a first and a second protrusion which are adapted to respectively engage the grooves when mounting the tire on the rim, forming two engaging sets of a protrusion and a corresponding groove. The two engaging sets permit fixing the position of the solid tire on the rim. To mount the solid tire to the rim, the tire usually is slid over the rim along an axial direction. Thereto, the first protrusion needs to be pulled over the second groove and subsequently over the outer contact surface of the rim towards the first groove. Finally, the first protrusion needs to be pulled into the first groove while simultaneously pulling the second protrusion into the second groove. DE-A1-10 2004 009 661 further teaches to add additional grooves to the outer contact surface, and a corresponding corrugation on the inner circumferential surface of the rim opposing the outer contact surface.

The wheel described by DE-A1-10 2004 009 661 however has the disadvantage that mounting of the tire to the rim is difficult because the need to subsequently pull the first protrusion in and out of the second groove before it can be positioned in the first groove.

DE-A1-10 2004 009 661 does not recognize this problem and instead teaches to add further grooves, caused by the additional corrugations, to the outer contact surface of the rim so that the protrusion needs to be pushed in and out of additional grooves before reaching its corresponding groove.

There is thus a need for a wheel which permits a more easy mounting of the solid tire to the rim.

Accordingly it is an object of the present invention to provide a wheel in which the solid tire can be more easily mounted to the rim.

This is achieved according to the present invention by a wheel showing the technical features of the characterising portion of the first claim.

Thereto, for each position on the outer contact surface of the rim and the inner contact surface of the tire, in mounting direction of the tire, at most one engaging set of the protrusion and the corresponding groove is provided.

By providing at most one engaging set in mounting direction of the tire for each position on the inner and outer contact surfaces, mounting the tire to the rim is substantially facilitated since it is no longer necessary to pull the protrusion in and out of a groove not corresponding to that protrusion so that the protrusion can be pulled further along into its cooperating groove. Instead, when the solid tire is pulled over the rim along the mounting direction, usually radial direction, and the protrusion is pulled towards its corresponding groove along the mounting direction no other grooves are encountered and therefore the protrusion does not need to be pulled in and out of a groove so that the protrusion can be pulled directly into its corresponding groove.

DE-A1-10 2004 009 661 also describes a tire according to DE-C2-2813213 having at most one engaging set in mounting direction of the tire. However, the tire described in DE-C2-2813213 does not have a reduced height but instead has a height which is more than 25% of the total height of the tire and partly extends over and rests on a rimpiece. Although DE-A1-10 2004 009 661 teaches to lower the base layer, it only discloses this teaching in combination with the first and second engaging set. In other words DE-A1-10 2004 009 661 only teaches to reduce the height of the rubber base layer in combination with replacing the rimpiece with a second engaging set since it was believed that the second engaging set was necessary to replace the function of the rimpiece, sufficiently connecting the tire to the wheel. Surprisingly, it has however been found by the inventor that for each location on the contact surface, in mounting direction of the tire, at most one engaging set is sufficient to sufficiently fix the position of the tire, having a base rubber layer with a reduced height, to the wheel.

A preferred embodiment of the rubber crawler according to the invention is characterised in that the tire comprises an outer tread surface extending in circumferential direction of the tire, being provided for contacting the ground and having a tread width measured along the axial direction of the tire, in that the inner contact surface has an inner contact width measured along the axial direction of the tire and in that the inner contact width is larger than the tread width.

The inventor has found that by providing a tire having an inner contact width which is larger than the tread width, the stability and load bearing capacity offered by the tire can be increased.

Further preferred embodiments are disclosed in the dependent claims.

Other details and advantages of the rubber crawler according to the invention will become apparent from the enclosed figure and description of preferred embodiments of the invention.

Figure 1:
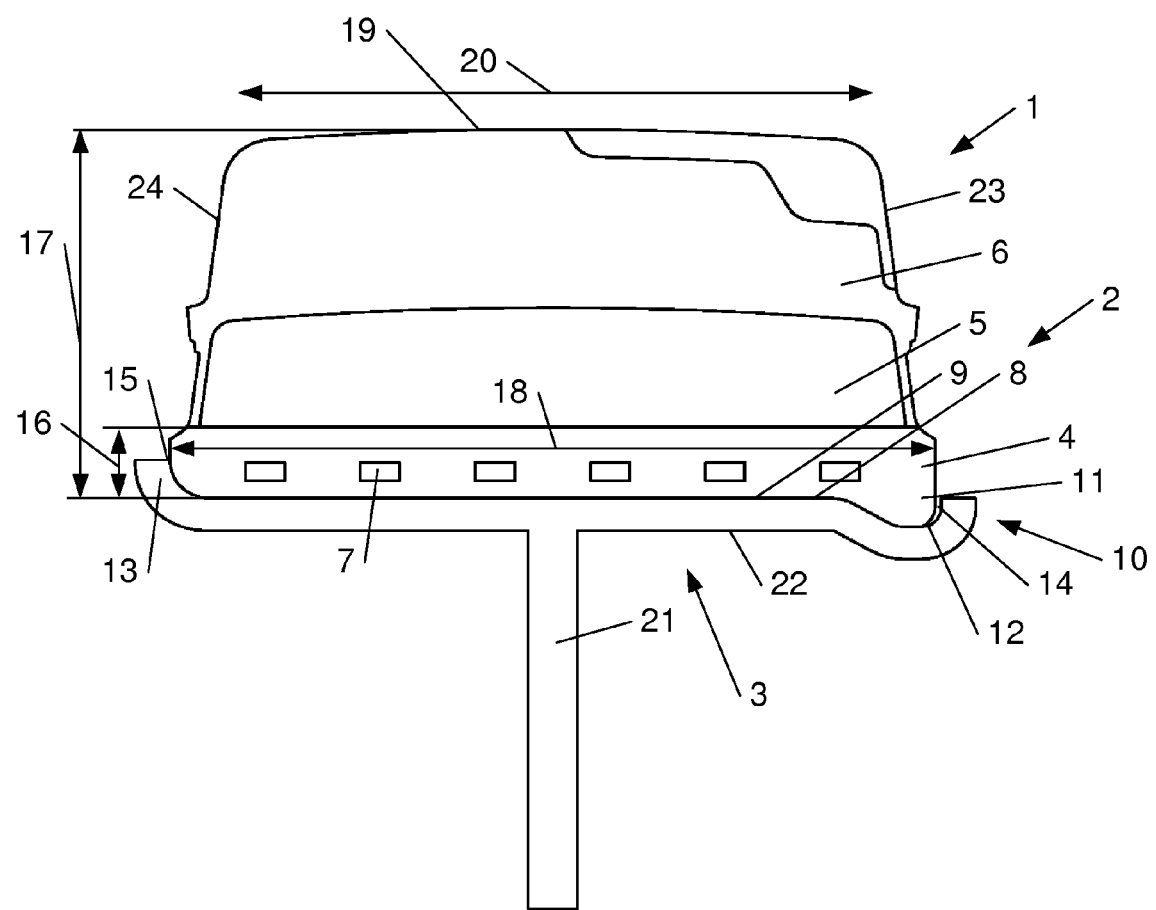
FIG. 1 shows a cross-section of a part of a wheel according to the invention.
Figure 2:
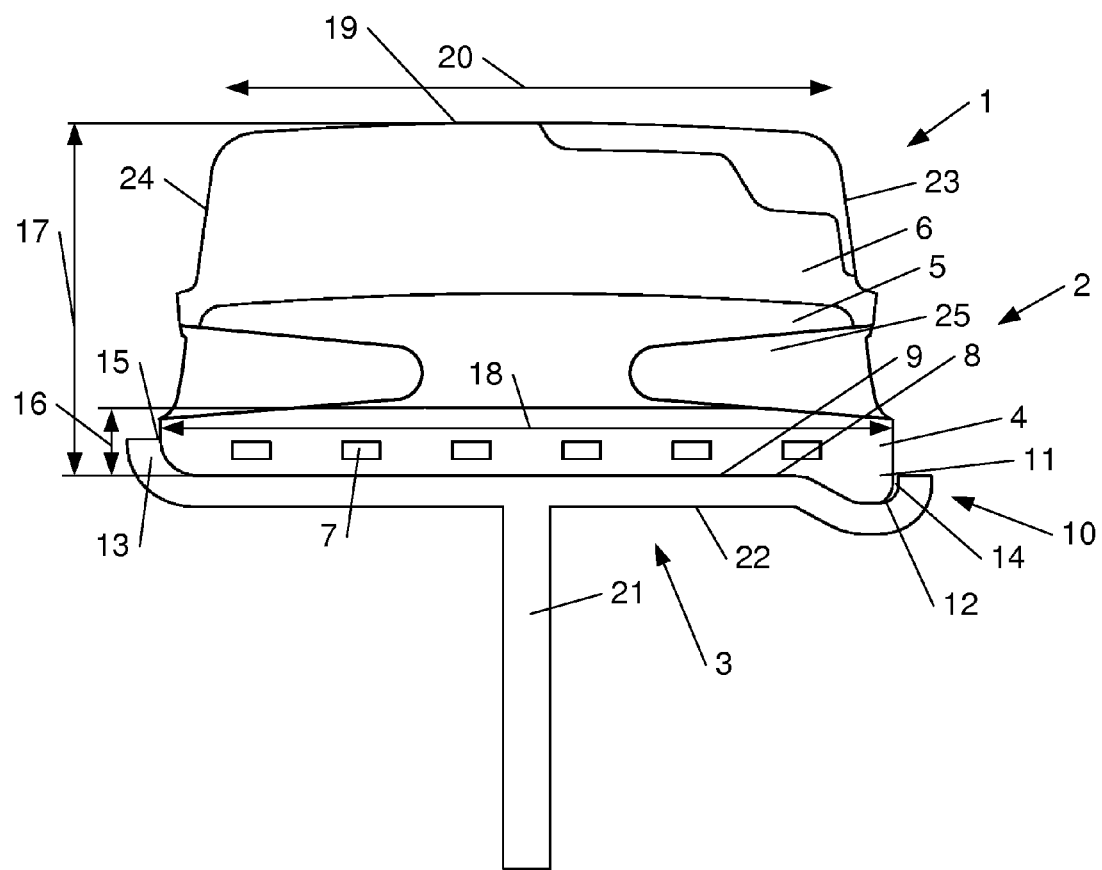
FIG. 2 shows a cross section of a part of a different embodiment of a wheel according to the invention.

The wheel 1 shown in FIGS. 1 and 2 comprises a solid tire 2 and a rim 3.

The rim 3 preferably is cylindrical. This is however not critical for the invention and the form of the rim 3 can be determined by the person skilled in the art.

The rim 3 comprises an outer circumferential contact surface 9. The outer circumferential contact surface 9 is provided to receive and assist in positioning the solid tire 2. The outer contact surface 9 is delimited by a first rim edge 14 and an opposing second rim edge 15. The outer contact surface 9 has an outer contact width which is defined along an axial direction of the rim 3 between the first 14 and the second rim edge 15.

The dimensions and form of the rim 3, more in particular the outer contact width, the diameter of the rim 3, etc., are not critical for the invention and can be determined by the person skilled in the art, amongst other things in function of the desired shape and dimensions of the wheel 1.

Preferably, the outer contact width is constant along the circumference of the rim 3, providing the rim 3 with more homogeneous rolling properties. However, the outer contact surface 9 can have any shape and dimension which is deemed appropriate by the person skilled in the art.

The rim 3 can be made of any material deemed appropriate by the person skilled in the art, but preferably is made of metal.

The method for making the rim 3 can be determined by the person skilled in the art, but preferably the rim 3 is made using a roll-press method. However, any other method for making a rim 3 can be used by the person skilled in the art.

Preferably, the rim 3 comprises an inner disc 21 extending substantially in a plane of rotation of the rim 3 delimited by a circumferential inner surface 22 of the rim 3. The inner disc 21 can for example be a full disc, can consist of spokes, etc. The inner disc 21 allows to increase the strength of the rim 3 and/or to mount the wheel 1 to for example, a drive axis for rotationally driving the wheel 1. The material of the inner disc 21 can also be determined by the person skilled in the art, but preferably also is metal.

Although the inner disc 21 can form one piece with the remainder of the rim 3, the inner disc 21 preferably is separately attached to the remainder of the rim 3 by any means known to the person skilled in the art, such as by bolting, nailing, stapling, welding, soldering, etc. Preferably, the inner disc 21 is mounted to the rim 3 by welding, more preferably by welding the inner disc 21 to the inner circumferential surface 22 of the rim 3.

The solid tire 3 preferably is cylindrical and has a circumferential extending tread surface 19 provided to contact the ground and an opposing circumferentially extending mounting surface provided to contact the outer contact surface 9 of the rim 3. The mounting surface and the tread surface 19 are delimited and interconnected by two opposing upright side faces 23, 24.

The tread surface 19 has a tread width 20 and the mounting surface has a mounting width both extending between the two opposing upright side faces along an axial direction of the tire 2.

The solid tire 2 has a height 17 extending between the tread surface and the mounting surface of the tire 2 along direction perpendicular along an axial direction of the wheel 1, as indicated on FIGS. 1 and 2.

The dimensions of the tire 2, more in particular the tread width 20 of the tread surface 19, the mounting width of the mounting surface, the height 17 of the tire 2, the shape of the tire 2, etc. are not critical for the invention and can be determined by the person skilled in the art. Preferably, the tread width 20 is smaller than the mounting width of the mounting surface.

The solid tire 2 comprises a base layer 4. The base layer 4 extends in circumferential direction of the tire 2 and is provided to contact and to be mounted to the outer circumferential contact surface 9 of the rim 3 with an inner circumferential contact surface 8, of the solid tire 2 which, in other words, is the mounting surface of the solid tire 2. The base layer 4 therefore connects the solid tire 2 to the rim 3 after the solid tire 2 has been mounted to the rim 3.

Opposing circumferential sides of the inner contact surface 8 is delimited by a first and a second circumferential edge of the base layer 4. The inner contact surface 8 of the base layer 4 has an inner contact width 18, in other words the mounting width, which is defined as the distance between the first and the second edge of the base layer 4 along axial direction.

Preferably, the inner contact width 18 of the base layer 4 of the tire 2 and the outer contact width of the rim 3 are substantially equal. This is however, not critical for the invention.

Preferably, the inner contact width 18 is constant along the circumference of the tire 2, providing the tire 2 with more homogeneous rolling properties. However, the inner contact width 18 can have any shape and dimension which is deemed appropriate by the person skilled in the art.

The rubber base layer 4 has a height 16 which is reduced, which in the context of the current application means that the height 16 of the rubber base layer 4 lies between 5%-20% of the height 17 of the tire 2. More preferably, the height 16 of the base layer 4 lies between 10%-15% of the height 17 of the tire 2.

The inventor has found that the height 16 of the base layer 4 can be reduced without substantially affecting the elasticity, which relates to comfort, and the stability of the tire 3. Therefore, a substantial reduction of material needed to make a tire 2 is accomplished. The reduction of material used in the tire 2 also reduces the friction generated in the material of the tire 2 while driving the wheel 1, resulting in less heating of the tire 2 caused by driving the tire 2 and consequently a more efficient use of the driving energy. The reduction of the height 16 of the base layer 3 preferably results in a tire 2 in which the ratio of the height 17 of the tire 2 to the width 18 of the base layer 4 decreases.

The hardness of the base layer 3 preferably is chosen so that an optimum balance between hardness and elasticity is reached. An increased elasticity of the base layer 4 for example allows the tire 2 to be more easily mounted to the rim 3 and/or for example increases shock absorbing properties of the tire 2, increasing the comfort of the tire 2. An increased hardness of the base layer 4 provides an increased stability of the connection between the tire 2 and the rim 3, and therefore of the tire 2 in general.

The hardness of the base layer 4 can be determined by the person skilled in the art, but preferably lies between 80-98 durometer Shore A, more preferably between 90-95 durometer Shore A. It has been found that such values for the hardness of the tire 2 provide a preferred balance between elasticity and hardness of the base layer 4, as explained above.

The base layer 4 preferably comprises reinforcing means 7. The reinforcing means 7 are not critical for the invention and any reinforcing means 7 deemed appropriate by the person skilled in the art can be used. The reinforcing means 7 preferably comprise at least one metal element provided in the base layer 4 near the inner contact surface 8. This element preferably extends at least partly circumferentially along the base layer 4. More preferably, the metal element extends along the entire circumference of the base layer 4. The diameter of the metal element can be determined by the person skilled in the art an depends on for example the height 16 of the base layer 4 and the desired strength offered by the reinforcing means 7. The diameter can for example be relatively small with respect to the height 16 of the base layer 4 and can be relatively large with respect to the base layer, as shown in FIGS. 1 and 2. Preferable, the diameter of the metal element, although not critical for the invention, remains substantially constant along circumferential direction of the tire 2.

Although the metal element shown in FIGS. 1 and 2 has a rectangular cross section, the form of the cross-section metal element can be determined by the person skilled in the art and can for example be round, oval, triangular, etc.

Preferably, a cross section of the base layer 4, as shown in FIGS. 1 and 2, comprises several, preferable coplanar, parts of at least one metal element. For example 2, 3, 4, 5, 6, 7, 8 or more parts of substantial coplanar metal elements.

The different parts of the at least one metal element can be formed by helically winding at least one, preferably a single, metal element around an axial direction of the tire 2. The metal element can for example comprise 2, 3, 4, 5, 6, 7, 8 or more windings. The parts of the at least one metal element can however also be provided by different metal elements each bent around the axial direction.

Although FIGS. 1 and 2 show a single layer of parts of metal elements, several layers can be for example provided in the base layer 4. For example, 2, 3, 4, 5, 6, 7, 8 or more layers can be provided. The number of layers provided can be determined by the person skilled in the art and depends for example on the desired strength and sliptorque of the tire with respect to the wheel offered by the reinforcing means 7, the height 16 of the base layer 4, the diameter of the different metal elements, etc.

Although the parts of the at least one metal element shown in FIGS. 1 and 2 are divided individually over the width 18 of the base layer 4, the different parts of the at least one metal element can also be grouped into groups of parts of metal elements. Such a group preferably comprises substantially adjacent and substantially collinear metal elements running along circumference of the base layer 4. For example, a central metal element surrounded by substantially adjacent and substantially collinear metal elements, as for example steel cord currently sold by the firm Bekaert, such as for example steelcord. The relative diameter of the different metal elements of a group of metal elements can be determined by the person skilled in the art, depending on for example the height 16 of the base layer 4 and the required strength offered by the reinforcing means 7. The groups of parts of metal elements may be substantially equally distributed over the inner contact width 18.

The groups of metal elements can have any cross section deemed appropriate by the person skilled in the art. The different metal elements can for example be arranged such as to obtain a group having a circular cross section, an oval cross section, a rectangular cross section, a substantially hexagonal cross section, etc.

The group of metal elements can also comprise several groups of metal elements. For example a group of metal elements having a substantially hexagonal cross section can for example comprise several, for example seven, groups of metal elements also having a hexagonal cross section. This can however be determined by the person skilled in the art and is not critical for the invention.

Preferably, a cross section of the base layer 4, as shown in FIGS. 1 and 2, comprises several, preferable coplanar, groups of at least one metal element. For example 2, 3, 4, 5, 6, 7 8 or more groups of metal elements.

The different groups of metal elements can be formed by helically winding at least one, preferably a single, group of metal elements around an axial direction of the tire 2. The group of metal elements can for example comprise 2, 3, 4, 5, 6, 7 8 or more windings around the axial direction of the wheel 1. The groups of metal elements can however also be provided by different groups of metal elements each bent around the axial direction.

Although FIGS. 1 and 2 show a single layer of groups of metal elements, several layers can be superposed in the base layer 4. For example, 2, 3, 4, 5, 6, 7 8 or more layers can be provided. The number of layers provided can be determined by the person skilled in the art and depends for example on the desired strength offered by the reinforcing means 7, the height 16 of the base layer 4, the diameter of the different metal elements, etc.

The reinforcing means 7 shown in FIGS. 1 and 2 for example contains a single metal element having a rectangular cross-section which comprises six windings in the base layer 4 around an axial axis of the tire 2. Alternatively, the strengthening element 7 shown in FIGS. 1 and 2 for example comprise several circumferential metal elements, more particularly six. Any other combination described above is however possible.

Preferably, the base layer 4 comprises groups of metal elements. More preferably, the diameter of the metal elements of the groups of metal elements is small with respect to the height 16 of the base layer 4. The inventor has found that such groups of metal elements having a relative small diameter offer a sufficient strength for the base layer 4 while allowing an improved reduced height 16. The inventor has found that the metal elements with a small diameter have an improved geometrical fit into the base layer 4 and surprisingly offer a more equal spread of tensions working on the reinforcing means 7.

Although the base layer 4 may comprise the tread surface 19, preferably at least one additional circumferential layer 5 is provided around the base layer 4. More preferably, two additional circumferential layers 5, 6 are provided around the base layer 4. The number of additional circumferential layers is however not critical for the invention and for example 3, 4, 5 or even more layers may be provided on top of the base layer 4.

The two additional circumferential layers 5, 6 preferably comprise a middle layer extending circumferentially around the base layer 4 and a tread layer 6 extending circumferentially around the middle layer 5 and providing the tread surface 19.

The form, dimensions and hardness of the middle and tread layer, and possibly additional layers, are not critical for the invention and can be determined by the person skilled in the art.

The hardness and thickness of the middle layer 5 preferable are chosen so that the middle layer 5 offers the tire 2 with the desired elastic properties. The hardness and thickness of the tread layer 6 preferable are chosen so that the tread layer 6 provides the tread surface 19 with the desired ground contacting properties. This can however be determined by the person skilled in the art.

Although, the two opposing upright side faces 23, 24 can be substantially flat, as for example in FIG. 1. One or both of the opposing side face may comprise at least one opening 25 extending substantially from the upright side face 23, 24 along the axial direction of the tire 2. The inventor has found that such an opening provides the tire 2 with elastic properties while reducing the amount of material needed for the tire 2. Reducing the amount of material, for example decreases production costs and heating of the material of the tire 2 under influence of friction while driving the tire 2.

Figure 3:
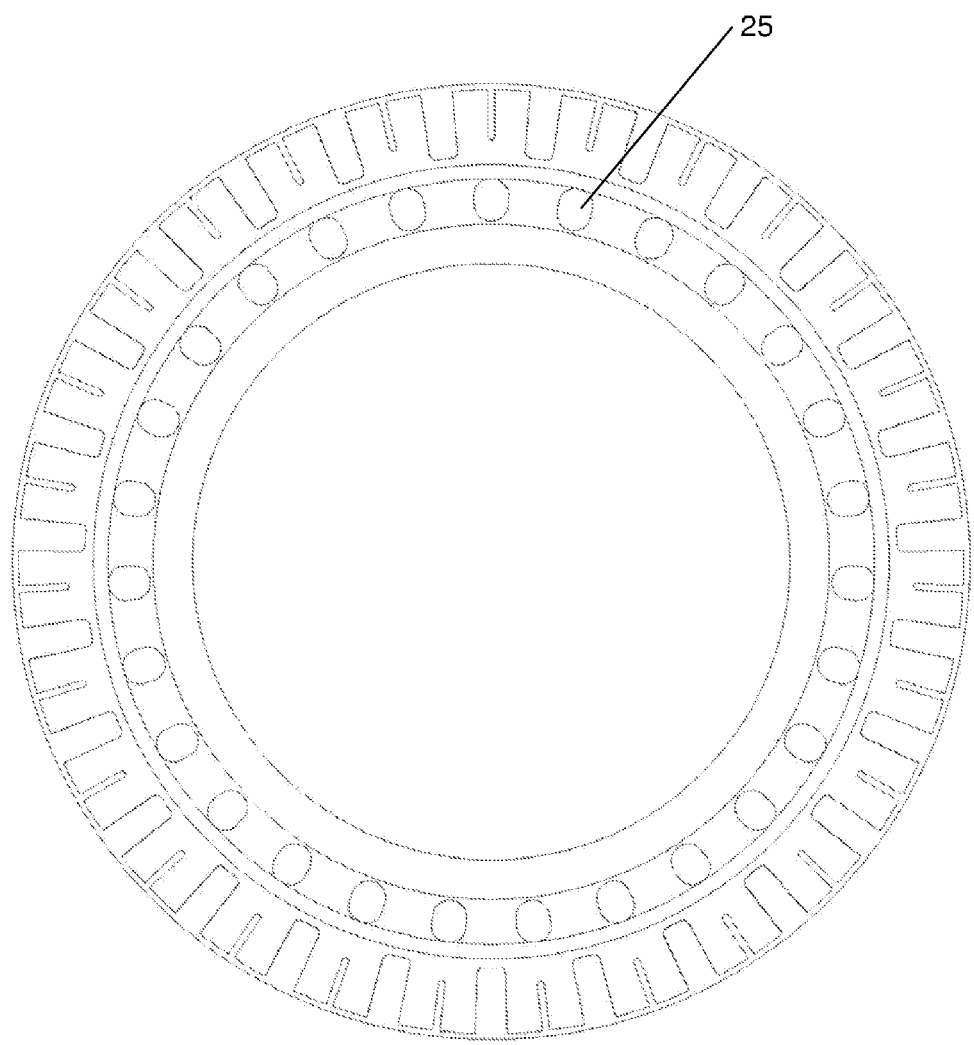
FIG. 3 shows a side view of a tire according to the invention.

Preferably, a plurality of openings 25 is provided along circumference of the tire 2, as shown in FIG. 3.

Preferably, the opening 25 is provided regularly along the circumference of the tire 2, as shown in FIG. 3. This is however not critical for the invention and the openings 25 can also be provided irregularly, depending on the required elasticity of the tire 2.

Although the openings 25 can be provided at only one of the opposing upright side faces 23, 24, the openings 25 are preferably provided on both upright side faces 23, 24, as shown in FIG. 3. The inventor has found that such a configuration provides the tire 2 with more stability and a more symmetric wear and support.

Although the opening 25 can fully penetrate the width of the tire 2, the opening 25 preferably does not fully penetrates the width of the tire 2, but ends at about the centre of the tire 2, as shown in FIG. 2.

Although, the mean diameter of the cross-section of the opening 25 can be substantially constant along the axial direction of the rim 3, the cross-section of the opening 25 preferably tapers towards the centre of the tire 2, as shown in FIG. 2.

The shape of the cross-section of the opening 25 preferably is oval, as shown in FIG. 3k, but can have any shape deemed appropriate by the person skilled in the art such as for example round, rectangular, square, triangular, etc.

The shape of the cross-section of the opening 25 can remain substantially the same along axial direction of the rim 3 or the shape can change from oval to triangular, round, square, rectangular, etc.

To mount the solid tire 2 to the rim 3, the solid tire 2 is provided to be pulled over the circumferential outer contact surface 9 of the rim 3 along a mounting direction at least partially running along, preferably parallel to, an axial direction of the tire 2, upon mounting to the rim 3.

The inner 8 and outer 9 contact surface of respectively the tire 2 and the rim 3 comprise at least one engaging set 10 of a protrusion 11 and a groove 12 for fixing the position of the tire 2 on the rim 3. The engaging set 10 extends along a first direction crossing the mounting direction. For each position on the outer 9 and inner 8 contact surface of the rim 3, in mounting direction of the tire 2, at most one engaging set 10 of the protrusion 11 and the corresponding groove 12 is provided.

The protrusion 11 can be provided in the inner contact surface 8 of the tire 2 as well as on the outer contact surface 9 of the rim 3, the corresponding groove 12 of the engaging set 10 is consequently mutatis mutandis provided on respectively the outer contact surface 9 of the rim 3 and the inner contact surface 8 of the tire 2.

Although it is not critical for the invention, the protrusion 11 of the engaging set 10 preferably is provided on the inner contact surface 8 of the tire 2 and the corresponding groove 12 preferably is provided on the outer contact surface 9 of the rim 3. The inventor has found that such a configuration of the engaging set 10 of the protrusion 11 and the corresponding groove 12, results in an improved fixing of the position of the tire 2 on the rim 3.

The engaging set 10 of the protrusion 11 and the corresponding groove 12 preferably extends linearly over the inner 8 and outer 9 contact surface. However, the engaging set 10 can have any form deemed appropriate by the person skilled in the art and can for example extend undulated, hooked, etc. over the inner 8 and outer 9 contact surface.

Since the protrusion 11 of the engaging set 10 is being received by the corresponding groove 12 of the engaging set 10, their cross-section is adapted to each other so that the fixation of the tire 2 on the rim 3 is improved.

Preferably, the cross-section of the protrusion 11 is adapted to substantially fill the cross-section of the corresponding groove 12. However, the cross-section of the protrusion 11 can also be provided to only partially fill the cross-section of the corresponding groove 12. The inventor has however found that by substantially filling the cross-section of the groove 12 with the cross-section of the protrusion 11 the fixation of the tire 2 on the rim 3 can be improved.

More preferably, the cross-section of the protrusion 11 and the groove 12 are adapted to each other such that one of the protrusion 11 and the groove 12 exerts a pressure onto the other. For example, when the protrusion 11 is provided in the inner contact surface 8 of the tire 2, the cross-section of the protrusion 11 preferably is adapted to the cross-section of the groove 12 so that the groove 12 compresses the protrusion 11 when mounted into the groove 12. Alternatively, when the groove 12 is provided in the inner contact surface 9 of the tire 2 and the protrusion 11 is provided on the outer contact surface 9 of the rim 3, the cross-section of the protrusion 11 is chosen such that it presses onto the groove when the tire 2 is fixed on the rim 3.

The shape of the cross-section of the protrusion 11 preferably is rounded, preferably arcuate, as shown in FIGS. 1 and 2. The inventor has found that a rounded shape for the cross-section of the protrusion 11 allows the protrusion to be easily mounted into its corresponding groove 12 without substantially increasing the risk that the protrusion 11 unwantedly leaves its corresponding groove 12. However, any other shape for the cross-section of the protrusion 11 is possible, such as square, rectangular, triangular, etc.

The shape of the corresponding groove 12 preferably is substantially identical to the shape of the protrusion 11, and preferably is rounded, more preferably arcuate. This, is however not critical for the invention and the groove 12 can have any other shape deemed appropriate by the person skilled in the art, such as square, rectangular, triangular, etc.

The dimensions of the cross-section of the engaging set 10 preferably are adapted to provide an optimum between an easy mounting of the tire 2 to the rim 3 and improving the fixation of the tire 2 on the rim 3. For example, although a protrusion 11 having a relatively large height and a corresponding groove 12 having a relatively large depth will improve the fixation of the tire 2 on the rim 3, it will be relatively difficult to fix the tire 2 on the rim 3, since the protrusion 11 needs to be put into the groove 12 when mounting the tire 2 to the rim 3. On the other hand, although a protrusion 11 having a relatively small height will be relatively easy to put into the corresponding groove 12, the fixation of the tire 2 on the rim 3 will deteriorate.

Preferably, the cross-section of the protrusion 11 and the corresponding groove 12 is constant along the length of the engaging set 10. This is however not critical for the invention and the cross-section of the protrusion 11 and the corresponding groove 12 can change along the length of the engaging set 10.

The first direction of the engaging set 10 of the protrusion 11 and the corresponding groove 12 is not critical for the invention as long as it crosses the mounting direction. The crossing of the first direction with the mounting direction improves the fixing of the tire 2 on the rim 3. The inventor has found surprisingly that by increasing the angle between the mounting direction and the first direction, the fixation of the tire 2 on the rim 3 is improved. Therefore, although not critical for the invention, the first direction preferably is substantially perpendicular to the mounting direction. However, any other angle between the first direction and the mounting direction is possible, for example: 5°-90°, 10°-90°, 20°-90°, 45°-90°, 60°-90°, 75°-90°, 80°-90°, 85°-90°.

The engaging set 10 of the protrusion 11 and the corresponding groove 12 preferably are provided near, more preferably adjacent to, the first rim edge 14, as shown in FIGS. 1 and 2. This, is however not critical for the invention and the engaging set 10 can be provided anywhere along the width 18 of the inner 8 or outer 9 contact surface.

Several engaging sets 10 may be provided as long as for each position on the inner 8 and outer 9 contact surface of the rim 3 at most one engaging set 10 of the protrusion 11 and the corresponding groove 12 is provided.

The number of engaging sets 10 can be determined by the person skilled in the art and depends for example on the length and the first directions of the engaging sets 10.

The different engaging sets 10 may all have a different first direction and can all be positioned at a different position between the first 14 and the second 15 rim edge. The different engaging sets 10 may also have different lengths.

Preferably, some, more preferably substantially all, most preferably all, of the different engaging sets 10 are positioned along an imaginary single line extending over the inner 8 and outer 9 contact surface, preferably along a substantial circumferential direction. More preferably, the first directions of the different engaging sets 10 are substantially parallel to each other. More preferably, the engaging sets 10 all have a substantially equal length. More preferably, the different first directions are substantially collinear.

For example, the inner 9 and the outer 9 contact surface of the rim 3 can comprise engaging sets 10 extending along a single first direction. Preferably, the different engaging sets 10 are provided on a single imaginary line. Preferably, the different engaging sets 10 are collinear.

The engaging sets 10 may also be provided alternatively on a first imaginary line and a second imaginary line, for example along the first rim edge 14 and the second rim edge 15 respectively, as long as for each position on the outer contact surface 9 of the rim 3, in mounting direction of the tire 2, at most one engaging set 10 of the protrusion 11 and the corresponding groove 12 is provided.

However preferably, the inner contact surface of the tire 2 and the outer contact surface of the rim 3 comprise a single engaging set 10. More preferably, the engaging set 10 extends circumferentially over the wheel wheel 1, preferably forming a circle. Such a single engaging set 10 is for example shown in FIGS. 1 and 2.

In its most preferred embodiment, the engaging set 10 therefore consists of a single circumferential engaging set 10 extending adjacent to the first rim edge 14, in which the protrusion 11 is provided on the inner contact surface 8 of the base layer 4 and the corresponding groove 12 is provided on the outer contact surface 9 of the rim 3.

The second rim edge 15 is not critical for the invention and can be fully determined by the person skilled in the art.

The second rim edge 15 preferably comprises a flange 13. The shape and dimensions of the flange 13 can be determined by the person skilled in the art. The flange 13 is however not critical for the invention and can for example be completely omitted.

The flange 13 may extend in any possible direction known deemed appropriate by the person skilled in the art. Preferably, the flange 13 extends towards the tread surface 19. However, the flange 13 can also extend away from the tread surface 19.

The widths of the inner contact surface and the outer contact surface preferably are adapted to each other such that the tire 2 abuts the flange 13 when the tire 2 is mounted to the rim 3. More preferably, the widths are adapted such that the tire 2 is pressed to the flange 13, thereby providing an improved fixation of the tire 2 on the rim 3. This is however not critical for the invention, and the tire 2 can be sufficiently mounted to the rim 3 without the tire 2 abutting the flange 13.

The flange 13 preferably has a height of between 0 mm and 15 mm. More preferably, the flange 13 has a height which lies between 0 mm and 10 mm. Most preferably, the flange has a height which lies between 5 mm and 10 mm.

Preferably, the height 16 of the base layer 4 is somewhat larger than the height of the flange 13. This is however not critical for the invention and the height of the base layer 4 can be smaller than the height of the flange 13.

When mounting the solid tire 2 to the rim 3, the solid tire 2 is pulled over the circumferential outer contact surface 9 of the rim 3 along the mounting direction.

When the engaging set(s) 10 are generally provided near a first upright side face 23 of the upright side faces 23, 24 of the solid tire 2 and the corresponding first rim edge 14 of the rim 3, the tire 2 is preferably pulled over the outer contact surface 9 of the rim 3 by:

first moving a second upright side face 24 of the upright side faces 23, 24 of the tire 2 over the first rim edge 14 towards the second rim edge 15 until the protrusion 11 is put in the corresponding groove 12 of the engaging set 10, when the groove 12 of the engaging set 10 is provided on the outer contact surface 9 of the rim 3 and the protrusion 11 of the engaging set is provided on the inner contact surface 8 of the tire 2 or by first moving the first upright side face 23 of the tire 2 over the second rim edge 15 towards the first rim edge 14 until the protrusion 11 is put in the corresponding groove 12 of the engaging set 10, when the protrusion 11 of the engaging set 10 is provided on the outer contact surface 9 of the rim 3 and the groove 12 of the engaging set is provided on the inner contact surface 8 of the tire 2.

This is however not critical for the invention and any other method for mounting the tire 2 to the rim 3 can be used by the person skilled in the art. The tire 2 can for example be slid over the rim 3 the other way around.

The wheel 1 in an embodiment in which the engaging set(s) 10 are generally closer to the first rim edge 14, preferably the engaging set 10 consists of a single circumferentially engaging set 10 extending closer to the first rim edge 14 than the second rim edge 15, and in which the protrusion 11 is provided on the inner contact surface 8 of the base layer 4 and the corresponding groove 12 is provided on the outer contact surface 9 of the rim 3 has a further advantage when the groove causes a corresponding rib on the inner surface 22 of the rim 3, as shown in FIGS. 1 and 2. When in such a wheel the inner disc 21 needs to be mounted to the rim 3, an inner disc 21 having a diameter substantially corresponding to an inner diameter of the rim 3, can be moved inside the rim along the second rim edge 15, after which the inner disc can be fixed inside the rim 3 by, for example, welding.

The invention claimed is:

1. A wheel (1) comprising a solid tire (2) and a rim (3), the solid tire (2) comprising a rubber base layer (4) with a reduced height (16) extending in circumferential direction of the solid tire (2), an inner circumferential contact surface (8) of the rubber base layer (4) being provided to contact an outer circumferential contact surface (9) of the rim (3), the solid tire (2) upon mounting to the rim (3) being provided to be pulled over the circumferential outer contact surface (9) of the rim (3) along a mounting direction at least partly running along an axial direction of the solid tire (2), the inner and outer contact surface (8, 9) comprising at least one engaging set (10) of a protrusion (11) and a corresponding groove (12) for fixing the position of the solid tire (2) on the rim (3) which extend along a first direction crossing the mounting direction, wherein for each position on the outer contact surface (9) of the rim (3) and the inner contact surface (8) of the solid tire (2), in mounting direction of the solid tire (2), at most one engaging set (10) of the protrusion (11) and the corresponding groove (12) is provided, and wherein the solid tire comprises an outer tread surface extending in circumferential direction of the solid tire, being provided for contacting the ground and having a tread width measured along the axial direction of the solid tire, in that the inner contact surface has an inner contact width measured along the axial direction of the solid tire and in that the inner contact width is larger than the tread width, with opposing upright side faces of the solid tire tapering generally inward from the rubber base layer upward to the outer tread surface.

2. A The wheel (1) as claimed in claim 1, wherein the tire (2) has a height (17) and in that the height (16) of the base layer (4) is 5%-20% of the height (17) of the tire (2).

3. The wheel (1) as claimed in claim 2, wherein the height (16) of the base layer (4) is 10%-15% of the height (17) of the tire (2).

4. The wheel (1) as claimed in claim 1, wherein the groove (12) of the engaging set (10) is provided on the outer contact surface (9) of the rim (3) and wherein the protrusion (11) of the engaging set (10) is provided on the inner contact surface (8) of the tire (2).

5. The wheel (1) as claimed in claim 1, wherein the rim (3) has a rim edge (14) delimiting the outer contact surface (9) and in that the engaging set (10) is provided at the rim edge (14).

6. The wheel (1) as claimed in claim 1, wherein the first direction crossing the mounting direction is substantially perpendicular to the mounting direction.

7. The wheel (1) as claimed in claim 1, wherein the protrusion (11) and the corresponding groove (12) of the engaging set (10) extend circumferentially over the wheel (1).

8. The wheel (1) as claimed in claim 1, wherein the base layer (4) has a hardness of 80-98 durometer Shore A.

9. The wheel (1) as claimed in claim 8, wherein the base layer (4) has a hardness of 90-95 durometer Shore A.

10. The wheel according to claim 1, wherein the inner contact surface (8) and an outer tread surface (19) are delimited and interconnected by two opposing upright side faces (23, 24) and wherein at least one of the opposing side faces (23, 24) comprises at least one opening (25) extending substantially from the upright side face (23, 24) along the axial direction of the tire (2).

11. A solid tire (2) for use with a rim (3) of a wheel (1), said solid tire (2) comprising:

a rubber base layer (4) with a reduced height (16) extending in circumferential direction of the solid tire (2), an inner circumferential contact surface (8) of the rubber base layer (4) being provided to contact an outer circumferential contact surface (9) of the rim (3), the solid tire (2) upon mounting to the rim (3) being provided to be pulled over the circumferential outer contact surface (9) of the rim (3) along a mounting direction at least partly running along an axial direction of the solid tire (2), the inner contact surface (8) comprising at least one engaging set (10) of a protrusion (11) and a corresponding groove (12) for fixing the position of the solid tire (2) on the rim (3) which extend along a first direction crossing the mounting direction, wherein for each position on the inner contact surface (8) of the solid tire (2), in mounting direction of the solid tire (2), at most one engaging set (10) of the protrusion (11) and the corresponding groove (12) is provided, and wherein the solid tire comprises an outer tread surface extending in a circumferential direction of the solid tire, being provided for contacting the ground and having a tread width measured along the axial direction of the solid tire, in that the inner contact surface has an inner contact width measured along the axial direction of solid tire and in that the inner contact width is larger than the tread width, with opposing upright side faces of the solid tire tapering generally inward from the rubber base layer upward to the outer tread surface.

* * * * *